United States Patent

[11] 3,607,017

| [72] | Inventor | Rex R. Lloyd<br>Las Vegas, Nev. |
|---|---|---|
| [21] | Appl. No | 852,889 |
| [22] | Filed | Aug. 25, 1969 |
| [45] | Patented | Sept. 21, 1971 |
| [73] | Assignee | Titanium Metals Corporation of America<br>West Caldwell, N.J. |

[54] METHOD OF PRODUCING ANHYDROUS MAGNESIUM CHLORIDE
4 Claims, No Drawings

[52] U.S. Cl............................................................. 23/91,
23/201, 23/154, 204/70
[51] Int. Cl............................................................. C01f 5/34,
C01f 5/30
[50] Field of Search............................................ 23/91, 201,
154

[56] References Cited

UNITED STATES PATENTS

| 2,417,772 | 3/1947 | Marek............................ | 23/91 |
| 3,346,333 | 10/1967 | Nadler........................... | 23/91 |
| 3,395,977 | 8/1968 | Nadler........................... | 23/91 |

*Primary Examiner*—Edward Stern
*Attorney*—Webb, Burden Robinson & Webb

ABSTRACT: Process for treating hydrated magnesium chloride comprising drying the magnesium chloride, melting the dried magnesium chloride to produce a mixture of a liquid and a slurry, superheating the mixture at a temperature of at least 912° C. and decanting the liquid from the slurry. Alternatively, the liquid may be decanted from the slurry prior to superheating and only the liquid superheated.

METHOD OF PRODUCING ANHYDROUS MAGNESIUM CHLORIDE

This invention relates to the treatment of hydrated magnesium chloride for use as feed material in anhydrous type electrolytic magnesium cells and more particularly to the treatment of hydrated magnesium chloride to remove water and reaction products of water and magnesium chloride therefrom. In practice, the magnesium chloride feed material may contain other metal chlorides, such as the chlorides of sodium, potassium, lithium and calcium.

My invention provides magnesium chloride for use as cell feed material in the production of magnesium in electrolytic cells designed for operation with anhydrous magnesium chloride cell feed material. It is essential that the magnesium chloride used as feed material in a certain type of electrolytic cell be anhydrous. Since magnesium chloride contains water as produced and absorbs water during storage, it is necessary to remove the water and the reaction products of water and magnesium chloride prior to feeding it to this type of cell.

There are presently two types of electrolytic magnesium cells in commercial use. The cells are basically different in that one type uses hydrated magnesium chloride as feed material, and the other type requires an anhydrous magnesium chloride feed material. In the type of cell which can be charged with the hydrated magnesium chloride, the feed material normally calculates at about $MgCl_2 \cdot 1.5H_2O$. Analysis of the off gas from this type cell indicates that the hydrated magnesium chloride partially decomposes into $MgO+HCl$. The HCl and any water in the feed material which does not react with $MgCl_2$ are evolved as gases. The primary reaction at the cell anodes is release of chlorine, and part of the chlorine reacts with MgO in the feed material in the presence of the graphite anodes, and as a result of this reaction, the graphite anodes are gradually consumed. Equipment is included in this type of cell for periodically adjusting the anodes to compensate for graphite consumption. However, periodic adjustment of the anodes is an appreciable labor cost, and graphite consumption is also an expense. The anode gases consist of chlorine mixed with HCl, CO, $CO_2$ and air, and, hence, the chlorine is too dilute for economic recovery except by conversion to HCl. Additionally, the current efficiency in this type of cell is normally 75 percent to 80 percent.

A cell requiring the use of anhydrous magnesium chloride feed material normally operates at a current efficiency between 85 percent and 95 percent and recovers over 90 percent of the chlorine as an 85 percent to 95 percent chlorine gas. However, if this type of cell is fed with magnesium chloride containing water or products resulting from reactions between water and $MgCl_2$, the current efficiency of the cell drops and the anodes are gradually consumed which is disadvantageous since there is no provision in this type of cell for anode adjustment. Furthermore, when magnesium chloride containing MgOHCl or HCl in solution is fed to this type of cell, the evolution of gas and the deposition of hydrogen at the cathodes is severe, and the cell may boil over. The major advantages of a cell feed material having practically no water and no products resulting from the reaction of water with $MgCl_2$ are high current efficiencies and extremely low anode consumption.

The method of producing the magnesium chloride for treatment by my invention is not critical, and any of several well-known methods may be used to produce magnesium chloride solution or $MgCl_2 \cdot 6H_2O$. When hydrated magnesium chloride is carefully heated, the water of hydration can be decreased to approximately $MgCl_2 \cdot 2H_2O$ without decomposition of the magnesium chloride into MgO and HCl or other compounds such as MgOHCl. In commercial practice, the water of hydration may be reduced to approximately $1.5H_2O$ by careful drying without serious decomposition. However, further drying causes the magnesium chloride to decompose, and eventually approximately equal stoichiometric amounts of anhydrous $MgCl_2$ and MgO are produced. Magnesium oxide is an undesirable contaminant in cell feed material.

Commercial drying of solutions containing magnesium chloride will typically yield material containing about 5 percent each of MgO and $H_2O$. When this product is subsequently heated to its melting point, further decomposition occurs, and the final product will contain about 11 percent MgO. Heating the material to its melting point produces a liquid phase and a slurry phase. The slurry consists of MgO and other insoluble impurities in a liquid melt of $MgCl_2$ or $MgCl_2$ mixed with other chlorides depending upon the relative impurity of the original magnesium chloride containing brine. While the liquid is theoretically suitable for use as feed material in anhydrous electrolytic magnesium cells, it has been determined that one or more decomposition products inherently remain dissolved in the liquid. The liquid is decanted from the slurry and when the decanted liquid is added to an electrolytic cell, a large quantity of gas is evolved, and MgO may deposit on the cathode. The current efficiency of magnesium recovery is substantially reduced. Tests have indicated that magnesium current efficiencies are as low as 57 percent–70 percent over extended periods with feed material produced in this manner, whereas normal magnesium current efficiency is between about 85 percent and 95 percent.

Sources of magnesium chloride are the reactions of titanium tetrachloride with magnesium in the manufacture of titanium metal sponge and the reactions of zirconium tetrachloride with magnesium in the manufacture of zirconium. A product of this type of reaction is anhydrous magnesium chloride which is suitable for cell feed material. However, when this anhydrous material cannot be immediately supplied to an electrolytic magnesium cell, it must be stored, and the stored material tends to hydrate on the exposed surfaces. The magnesium hydrates are very hydroscopic, and they pick up more water leaving a layer of hydrated magnesium chloride on the outside of the cake. Typically, large cakes of such material are crushed to minus 1.5 inch and either charged directly to a magnesium cell or melted for use as molten feed material. In either case, a film of hydrate or $MgCl_2$ solution is formed rapidly on the exposed portions of the crushed material. When this crushed material is melted, a portion of the water reacts with the magnesium chloride to yield MgOHCl, HCl and MgO. The MgO collects in the bottom of the melting vessel, and a relatively clear molten salt fills the top portion of the vessel. The MgO or smut layer is discarded or used for some other purpose while the molten salt layer is pumped into insulated pots and charged to electrolytic cells. When the molten material obtained by melting the crushed caked material is used as charge material in a magnesium cell, it causes low current efficiency and a tendency toward plating out of hydrogen along with magnesium at the cathode. Additionally, extremely rapid gas evolution may occur when the material is poured into the cell.

I have found superheating magnesium chloride cell feed material produced in accordance with known practices or crushed from cake material obtained as a byproduct in the production of titanium sponge or zirconium to at least 200° C. above the melting point of magnesium chloride will cause a very rapid release of gas. Superheating the liquid to at least 200° C. above the melting point of magnesium chloride is believed to cause MgOHCl to react to form MgO and HCl, and the HCl plus any HCl which may have been dissolved in the liquid are released as gas. Additionally, direct removal of water from the liquid is believed to occur. The superheated liquid may be either cooled or supplied directly to an electrolytic magnesium cell.

My invention consists in an improved process for producing anhydrous magnesium chloride from hydrated magnesium chloride. The known process consists basically in drying the hydrated salt by any well-known manner such as spray drying or kiln drying followed by melting the dried product to produce a liquid and a slurry in the melting vessel. The improvement of my invention consists in superheating the liquid, either alone or in combination with the slurry, at a temperature of at least 200° C. above the melting point of magnesium chloride which is about 712° C. Heating must be carried out in apparatus capable of handling the rapid evolution of gas caused by the superheating, but the specific apparatus and method of heating are not critical and are not a part of my invention. The heated material is then cooled or supplied directly to an electrolytic cell designed for electrolysis of anhydrous magnesium chloride. It will be advantageous to redissolve the magnesium oxide containing a slurry in a solution of hydrochloric acid to produce a magnesium chloride solution which may be recycled through the process, and this recycling is included within the scope of my invention.

The quality of molten cell feed material for production of magnesium may be determined by measuring the direct current potential necessary to cause current to pass through the material. The test is performed by measuring the current flow at a low voltage such as 1.0 volt. In this test, cell feed material of high purity will pass a minimum amount of current indicating that there is little H + ion in the material, and contaminated material will pass a relatively higher amount of current since hydrogen or some other material with a low decomposition potential is being released at the cathodes. A polarograph is used to determine the decomposition potential of the cell material and, from past experience, it is known that a current flow of 32 milliamperes at 1.0 volt represents cell feed material suitable for use in a cell requiring anhydrous feed material.

As shown in Table I, superheating the cell feed material to 950° C., which is approximately 240° C. above the melting point of magnesium chloride, results in a material having a low polarographic reading which shows that it is acceptable cell feed material. Material heated to a temperature less than 200° C. above the melting temperature of magnesium chloride has a substantially higher polarographic reading which indicates that it would not be acceptable cell feed material. In Table I, the starting material in each instance was 5—5 spray dried magnesium chloride.

TABLE I

| | Milliamperes | | |
|---|---|---|---|
| Volts | 850° C. | 900° C. | 950° C. |
| 1.0 | 58 | 83 | 32 |

My process may be advantageously and inexpensively utilized for producing magnesium chloride feed material for subsequent use in anhydrous electrolytic magnesium cells.

While I have shown and described a preferred embodiment of my invention, it is to be understood that it may be embodied within the scope of the appended claims.

I claim:

1. A process for treating hydrated magnesium chloride to produce anhydrous $MgCl_2$, useful as feed material in anhydrous type electrolytic magnesium cells, said process comprising the steps of:
   A. drying a hydrated magnesium chloride;
   B. melting the thus dried magnesium chloride to produce a mixture of a molten liquid containing $MgCl_2$ and a slurry containing magnesium oxide;
   C. superheating said mixture at a temperature of at least 912° C. to rapidly release essentially all of the hydrogen chloride containing gas from said mixture and to directly remove any water from the mixture; and
   D. decanting the molten liquid of anhydrous $MgCl_2$ from said slurry.

2. A process for treating hydrated magnesium chloride as set forth in claim 1 including:
   A. dissolving said slurry in a solution of hydrochloric acid to produce a solution containing magnesium chloride;
   B. subjecting said solution to said steps of
      1. drying,
      2. melting and
      3. superheating at a temperature of at least 912° C.; and
   C. decanting molten liquid of anhydrous $MgCl_2$ from the superheated solution.

3. A process for treating hydrated magnesium chloride to produce anhydrous $MgCl_2$, useful as feed material in anhydrous-type electrolytic magnesium cells, said process comprising the steps of:
   A. drying a hydrated magnesium chloride;
   B. melting the thus dried magnesium chloride to produce a mixture of a molten liquid containing $MgCl_2$ and a slurry containing magnesium oxide;
   C. decanting said molten liquid from said slurry; and
   D. superheating said decanted liquid at a temperature of at least 912° C. to rapidly release essentially all of the hydrogen chloride containing gas from said liquid and to directly remove any water from said liquid.

4. A process for treating hydrated magnesium chloride as set forth in claim 3 including:
   A. dissolving said slurry in a solution of hydrochloric acid to produce a solution containing magnesium chloride;
   B. subjecting said solution to the steps of
      1. drying and
      2. melting;
   C. decanting molten liquid from said solution; and
   D. superheating said decanted liquid at a temperature of at least 912° C.